(12) United States Patent
Tamura et al.

(10) Patent No.: US 6,856,052 B2
(45) Date of Patent: Feb. 15, 2005

(54) STATOR CORE, AND METHOD AND APPARATUS FOR PRODUCING THE SAME

(75) Inventors: Syuuichi Tamura, Tokyo (JP); Tsuyoshi Takahashi, Tokyo (JP); Shuji Tohyama, Tokyo (JP); Yoshihiro Kazuha, Tokyo (JP); Atsushi Oohashi, Tokyo (JP); Katsuya Kinoshita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/207,811

(22) Filed: Jul. 31, 2002

(65) Prior Publication Data

US 2003/0141770 A1 Jul. 31, 2003

(30) Foreign Application Priority Data

Jan. 29, 2002 (JP) ..................................... P.2002-020192

(51) Int. Cl.$^7$ .......................... H02K 3/34; H02K 15/10
(52) U.S. Cl. ......................................... 310/45; 310/215
(58) Field of Search ......................... 264/272.19, 272.2; 310/42, 45, 215, 216; 427/458, 475, 476, 104; 118/309, 312, 627, 634

(56) References Cited

U.S. PATENT DOCUMENTS

| 4,055,503 | A | * | 10/1977 | Anselment et al. | .......... 508/130 |
| 5,034,245 | A | * | 7/1991 | Matsubara | ................... 427/510 |
| 5,179,910 | A | * | 1/1993 | Habsburg-Lothringen | .. 118/634 |
| 5,428,257 | A | * | 6/1995 | Lurkens | ....................... 310/168 |
| 6,129,952 | A | * | 10/2000 | DeHart | ........................ 427/356 |
| 6,458,210 | B1 | * | 10/2002 | Bellemare et al. | .......... 118/409 |
| 6,458,427 | B2 | * | 10/2002 | Bertellotti et al. | .......... 427/459 |

FOREIGN PATENT DOCUMENTS

| JP | 57-135655 | * | 8/1982 | .......... H02K/15/02 |
| JP | 2001-238419 | * | 8/2002 | .......... H02K/19/22 |

* cited by examiner

Primary Examiner—Thanh Lam
Assistant Examiner—Judson H. Jones
(74) Attorney, Agent, or Firm—Sughrue Mion, PLLC

(57) ABSTRACT

In a stator core having a plurality of teeth, which elongate in an inner radial direction and slots, which are configured among the teeth, powder is caused to adhere to the stator core, the powder adhering to an inner peripheral face of the stator core is removed, and the stator core is heated to melt and harden the powder.

2 Claims, 6 Drawing Sheets

STATOR CORE, AND METHOD AND APPARATUS FOR PRODUCING THE SAME

BACKGROUND OF THE INVENTION

1. Field of the Invention

The present invention relates to a powder-coated stator core, a coating method for the stator core, and a coating apparatus for the stator core, and more particularly to powder coating of a stator core of a vehicular rotary electric machine.

2. Description of the Related Art

FIG. 10 is a section view showing the configuration of a vehicular alternator, which is disclosed in, for example, JP-A-2001-238419. In FIG. 10, 1 denotes a front bracket, 2 denotes a rear bracket, 3 denotes a stator, which is interposed between the front bracket 1 and the rear bracket 2 and is configured by a stator core 4 and a stator coil 5, and 6 denotes a rotor. The rotor includes a rotation shaft 7 in which the both ends thereof are supported by the front bracket 1 and the rear bracket 2, respectively, rotor cores 8 and 9, which are attached to the rotation shaft 7, a field coil 10, which is wound between the rotor cores 8 and 9, fans 11 and 12, which are disposed on the back sides of the rotor cores 8 and 9, respectively, and a slip ring 13, which is disposed on the rotation shaft 7 to supply a current to the field coil 10. The outer peripheries of the rotor cores 8 and 9 are opposed via an air gap to the inner periphery of the stator core 4. The reference numeral 14 denotes a pulley, which is disposed on the rotation shaft 7. The reference numeral 15 denotes a brush for supplying a current to the slip ring 13, 16 denotes a brush holder, which holds the brush 15, 17 denotes a three-phase full-wave rectifier, which rectifies the AC output of the stator coil 5, and 18 denotes a regulator, which adjusts the current of the field coil 10 to control the output voltage of the stator coil 5. These components are attached to the rear bracket 2. The stator coil 5, which is wound and inserted into the stator core 4, is extended toward the rear bracket 2, and a joining terminal 19 is welded to the tip end. The terminal is connected and fixed to a terminal 17a of the rectifier 17.

In the thus configured vehicular alternator, the stator 3 is formed by applying an insulating process on the stator core 4, and then inserting or winding the stator coil 5 on the stator core. The insulating process can be conducted by a method such as that insulating paper is interposed between the stator core 4 and the stator coil 5, or that powder coating for insulation is applied to the surface of the stator core 4. As disclosed in, for example, JP-A-Sho.57-135655, a method in which powder coating is conducted after a jig is mounted on the inner radial side of the stator core 4 to take a measure (masking) for preventing powder from adhering to a portion not to be powder-coated is usually employed as a method of producing a stator of a vehicular alternator or the like that is requested to be mass-produced at a lower cost.

The stator core 4 of the vehicular alternator is powder-coated as described above. When the number of the slots or the dimensions of the stator core are changed, therefore, the jig must be changed, and a work of replacing the jig with another one is necessary. When a large clearance is formed between the stator core 4 and the jig, masking may not be surely performed, thereby raising the possibility that powder adhering to the inner peripheral face of the stator core 4 rubs against the outer peripheral faces of the rotor cores 8 and 9. When the air gap is increased in order to cope with this, the performance of the alternator is lowered. Alternatively, a work of removing the excess powder adhering to the inner peripheral face of the stator core 4 must be additionally conducted. By contrast, when the clearance between the stator core and the jig is too small, the jig cannot be smoothly mounted or dismounted, and positioning between the jig and the stator core 4 must be conducted. Furthermore, the removal of powder adhering to the jig must be conducted after the jig is dismounted from the stator core 4. In this way, the method has also a problem with productivity.

In the method according to the related art in which the inner peripheral face of the stator core 4 is masked by the jig, powder can be applied only from the side of the axial end faces of the stator core 4. In the case where the slot area is reduced as a result of an increased number of slots or the axial length of the stator core 4 is prolonged, therefore, powder coating is ununiformly conducted in such a manner that, for example, the film thickness on the axial end faces of the stator core 4 is large but that in a slot in the vicinity of the axial center is small. This causes a coil failure such as that the insulation property is lowered, that the stator coil 5 cannot be accommodated in the slots, or that the stator coil 5 is damaged. When a thin stator coil 5 is used in order to prevent such a failure from occurring, there arises a problem such as that the performance is lowered.

SUMMARY OF THE INVENTION

The invention has been conducted in order to solve the problems discussed above. It is an object of the invention to provide a stator core of high reliability, high performance, and high productivity in which powder is uniformly applied into slots of the stator core so that the insulation property and the space factor are improved, a coil failure does not occur, and a jig can be commonly used, and also to provide a method and apparatus for producing such a stator core.

According to a first aspect of the invention, there is provided a stator core having a plurality of teeth and slots. The plurality of teeth elongate in an inner radial direction thereof. The slots are formed among the teeth. Powder is caused to adhere to the stator core. The powder adhering to an inner peripheral face of the stator core is removed. The stator core is heated to melt and harden the powder.

According to a second aspect of the invention, there is provided a method of producing a stator core having a plurality of teeth and slots. The teeth elongate in an inner radial direction. The slots are formed among the teeth. The method includes the steps of causing powder to adhere to the stator core, removing the powder adhering to an inner peripheral face of the stator core, and heating the stator core to melt and harden the powder.

According to a third aspect of the invention, there is provided an apparatus for producing a stator core having a plurality of teeth and slots. The plurality of teeth elongate in an inner radial direction. The slots are formed among the teeth. The apparatus includes a roller, a rotating member, and a member. The roller is placed parallel to an axial direction of the stator core and supporting an inner periphery of the stator core. The rotating member for rotating the roller to rotate the stator core. The member for causing powder to adhere to the stator core.

As described above, according to the first aspect of the invention, a jig for masking does not exist on the inner radial side of the stator core, so that the adhesion of the powder can be uniformalized, and the powder on the inner peripheral face can be surely removed. As a result, it is possible to obtain a stator core of high reliability, high productivity, and high performance.

According to the second aspect of the invention, a jig for masking does not exist on the inner radial side of the stator core, so that works of mounting and dismounting such a jig are not required, the adhesion of the powder can be uniformalized, and the powder on the inner peripheral face can be surely removed. As a result, it is possible to obtain a method of producing a stator core which is high in reliability, productivity, and performance.

According to the third aspect of the invention, a jig for masking does not exist on the inner radial side of the stator core, and hence works of mounting or dismounting, and positioning such a jig are not required, whereby the apparatus can be simplified, and the adhesion of the powder is uniformalized. As a result, it is possible to obtain an apparatus for producing an economical stator core which is high in productivity and performance.

DETAILED DESCRIPTION OF THE PREFERRED EMBODIMENTS

Embodiment 1

Figure 1:
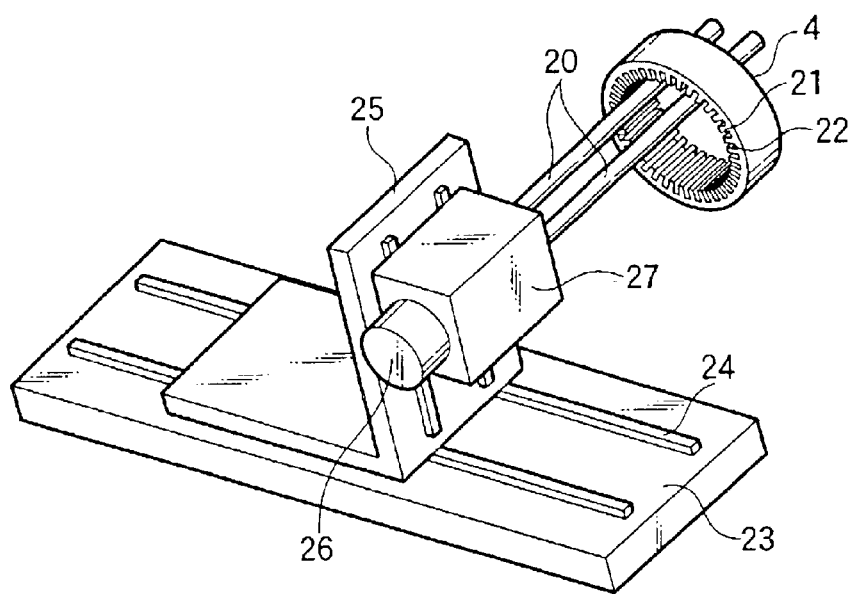
FIG. 1 is a perspective view showing means for rotating a stator core of Embodiment 1 of the invention.
Figure 2:
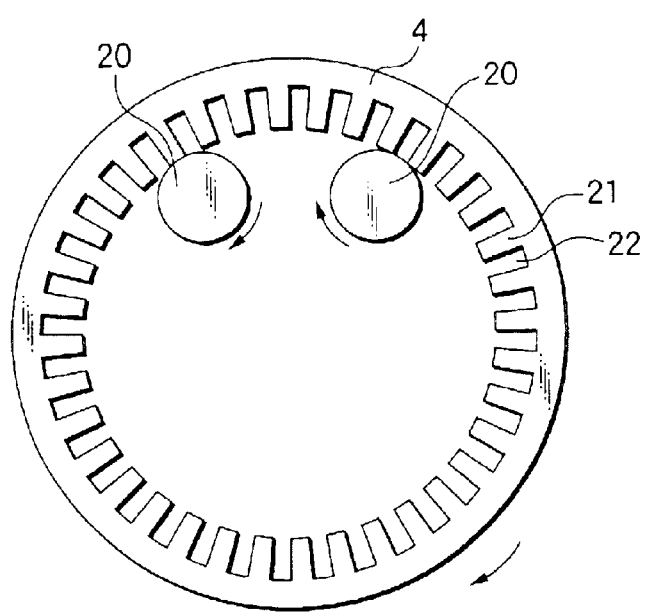
FIG. 2 is a front view of a stator core and rollers of FIG. 1.

FIGS. 1 to 7 illustrate a stator core according to Embodiment 1 of the invention, a method of producing the stator core, and an apparatus for producing the stator core. FIG. 1 is a perspective view showing rotating member for rotating two rollers 20 while the inner periphery of a stator core 4 is supported by the rollers 20, thereby rotating the stator core 4. FIG. 2 is a front view of the stator core 4 and the rollers 20. Referring to the figures, the stator core 4 includes a plurality of teeth 21, which elongate in an inner radial direction, and slots 22, which are configured among the teeth 21. In the illustrated example, the outer diameter of the stator core 4 is about 130 mm, and the number of the slots 22 is 36. A slide unit 25 is movable in lateral directions in the figure with being guided by rails 24 disposed on a base 23. A motor 26, a housing 27, and the rollers 20 which elongate from the housing 27 are mounted on the slide unit 25. The rollers 20 are made of, for example, brass, and elongate parallel to an axial direction of the stator core 4. The two rollers 20 are rotated in a direction of arrows by turning force of the motor 26, whereby the stator core 4 the inner periphery of which is supported by the rollers 20 can be rotated in the direction of the arrow.

Figure 3:
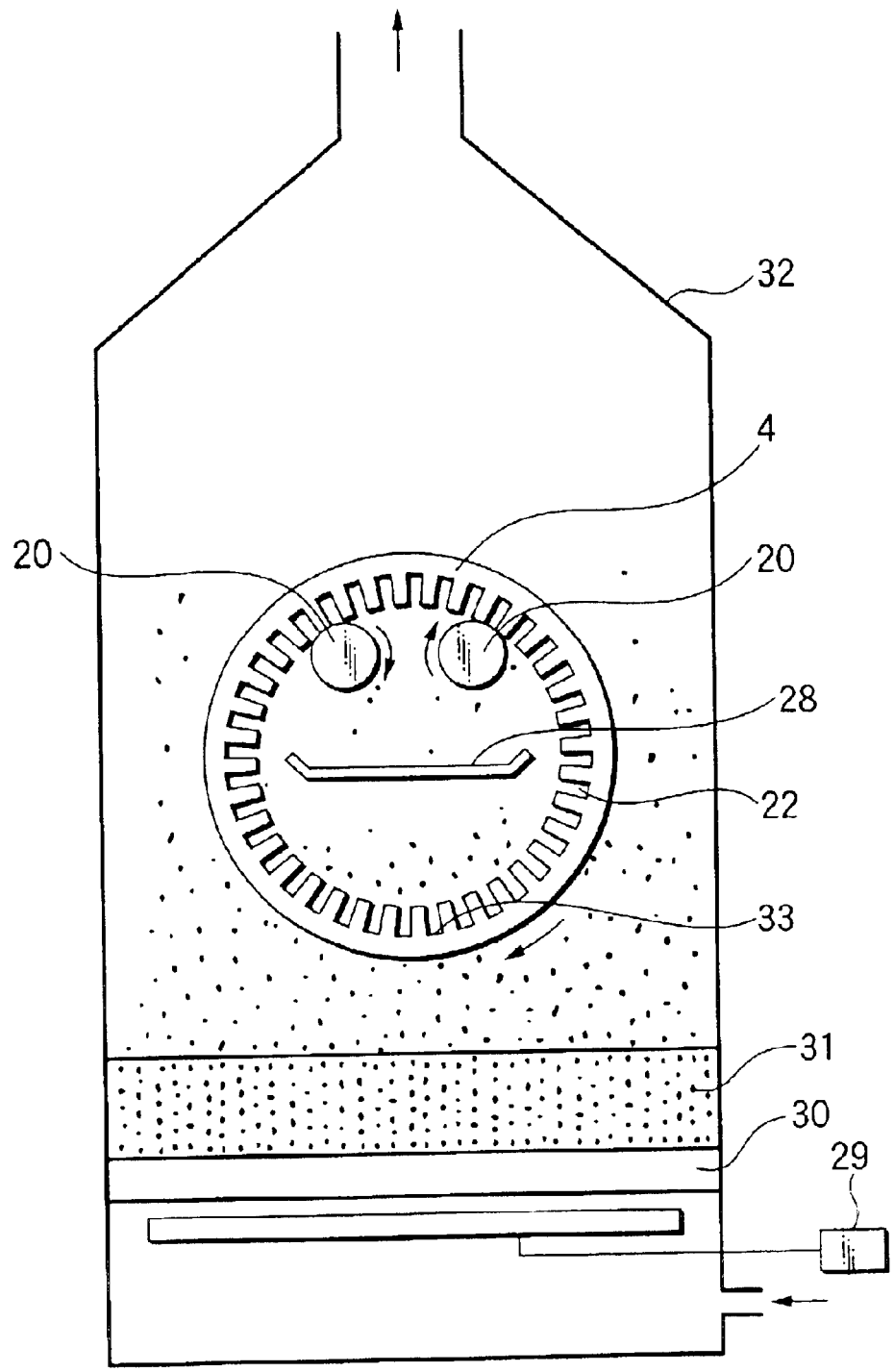
FIG. 3 is a diagram showing a step of and means for causing powder to adhere to the stator core of Embodiment 1 of the invention.

FIG. 3 is a diagram showing a step of causing powder to adhere to the stator core 4, and a member for the adhesion. The apparatus has rotating member such as shown in FIG. 1. As shown in FIG. 1, a partition plate 28 is placed in the inner radial side of the stator core 4. The stator core 4 is rotated by rotation of the rollers 20. The partition plate 28 is made of stainless steel or vinyl chrolide. A peripheral edge of the partition plate 28 is upward bent. The reference numeral 29 denotes a power source, and 30 denotes a porous plate. A layer of powder (powder 31 of an epoxy resin) is placed on the porous plate 30. A hood 32 covers these components. As indicated by an arrow in a lower right side of the figure, air is supplied into the hood 32 to flow in through pores of the porous plate 30, so that the powder 31 floats in the upper side as shown in the figure. On the other hand, the powder 31 is charged to, for example, the positive polarity as a result of energization by the power source 29, so that the powder 31 can be attracted to the stator core 4 by an electrostatic attractive force between the powder and the stator core 4.

Since the apparatus is configured as described above, while the stator core 4 is rotated, the powder 31 can adhere to the entire surface of the stator core. Since a jig for masking does not exist on the inner radial side of the stator core 4, particularly, works of mounting or dismounting, and positioning such a jig are not required, and the powder 31 floating in the inner radial side of the stator core 4 can adhere also from the inner radial side of the stator core 4 to the inner faces of the slots 22. Even when the number of the slots 22 is increased and the slot area is reduced, or when the axial length of the stator core 4 is prolonged, therefore, it is possible to obtain a step of and a member for the adhesion of the powder 31 in which the adhesion of the powder 31 can be uniformalized. Since the powder 31 can uniformly adhere, the insulation property and the space factor are improved, and a coil failure less occurs. Since the partition plate 28 is placed, it is possible to prevent the floating powder 31 and the adhering powder 31 from dropping to excessively deposit in core backs 33 of the slots 22, which are positioned in a lower side of the stator core 4 in the figure, so that the adhesion of the powder 31 can be uniformalized. Since the peripheral edge of the partition plate 28 is upward bent, the powder 31 collected on the partition plate 28 can be recovered and reused. Furthermore, the partition plate 28 can control the flow of the powder 31, which is caused to float by the air. Therefore, the adhesion of the powder 31 can be uniformalized, and the setting range of the adhesion thickness can be widened. When the amount of the air and the like are adjusted so that the density of the floating powder 31 is higher in the area below than the partition plate 28 and lower in the area above the partition plate as shown in the figure, the effect of the apparatus can be exerted more effectively, and the adhesion of the powder 31 can be uniformalized.

Figure 4:
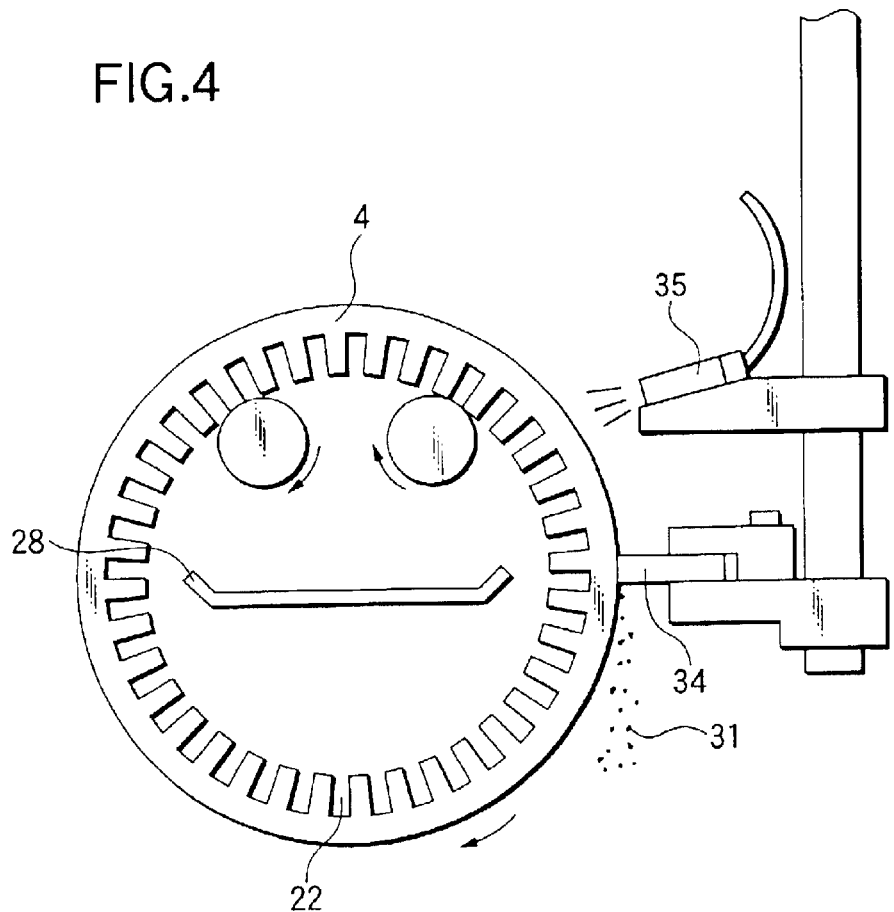
FIG. 4 is a diagram showing means for removing powder adhering to the outer peripheral face of the stator core of Embodiment 1 of the invention.

FIG. 4 is a diagram showing a member for removing the portion of the powder 31, which is caused to adhere to the stator core 4 in the process shown in FIG. 3, the portion adhering to the outer peripheral face of the stator core 4. The apparatus has the rotating member shown in FIG. 1, and a removing member for rubbing the outer peripheral face of the rotated stator core 4 with a rubber plate 34 and for blowing air from an air nozzle 35 against the outer peripheral face, thereby removing the powder 31 adhering to the outer peripheral face of the stator core 4. The partition plate 28 is placed in the inner radial side of the stator core 4.

In the apparatus configured as shown in FIG. 4, the powder 31, which adheres to the outer peripheral face of the stator core 4, and which does not contribute to the insulation of the stator coil 5 can be removed uniformly and surely by rubbing the outer peripheral face of the rotated stator core 4 with the rubber plate 34 and blowing air from the air nozzle 35 against the outer peripheral face. The placement of the partition plate 28 can prevent the powder 31, which is removed or drops from the stator core 4, from adhering to the slots 22 and the inner peripheral face of the stator core 4. Since the peripheral edge of the partition plate 28 is upward bent, the powder 31 collected on the partition plate 28 can be recovered and reused.

Figure 5:
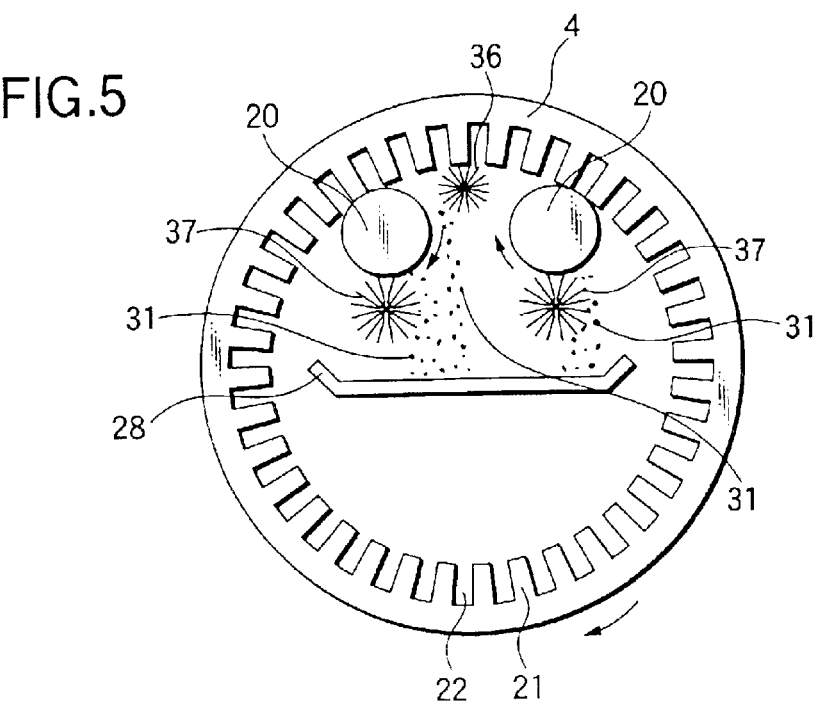
FIG. 5 is a diagram showing a step of and means for removing powder adhering to the inner peripheral face of the stator core of Embodiment 1 of the invention, and also means for removing powder adhering to the rollers.

FIG. 5 is a diagram showing a step of and a member for removing the portion of the powder 31, which is caused to adhere to the stator core 4 in the process shown in FIG. 3, the portion adhering to the inner peripheral face of the stator core 4, and also a member for removing the powder 31 adhering to the rollers 20. The apparatus shown in FIG. 5 has the rotating member shown in FIG. 1, and touches a rotary brush 36 against the inner peripheral face of the rotated stator core 4, thereby removing the powder 31 adhering to the inner peripheral face of the stator core 4. The apparatus further has rotary brushes 37, which remove the powder 31 adhering to the rollers 20. The rotary brushes 36 and 37 are made of nylon or horse hair. The partition plate 28 is placed in the inner radial side of the stator core 4.

Since the apparatus is configured as shown in FIG. 5, the powder 31, which adheres to the inner peripheral face of the stator core 4, and which does not contribute to the insulation of the stator coil 5 can be removed uniformly and surely by touching the rotary brush 36 against the inner peripheral face of the rotated stator core 4. Therefore, the powder does not rub against the rotor cores 8 and 9, and hence the air gap can be correspondingly reduced, so that the performance is improved. Since the apparatus further has the rotary brushes 37, which remove the powder 31 adhering to the rollers 20, the powder 31 adhering to the rollers 20 does not adhere to the inner peripheral face of the stator core 4. Since the removal from the inner peripheral face is conducted simultaneously with that from the rollers 20, higher removal efficiency is attained and the time period of the removal can be shortened. The placement of the partition plate 28 can prevent the powder 31, which is removed or drops from the stator core 4, from adhering to the slots 22 and the inner peripheral face of the stator core 4. Since the peripheral edge of the partition plate 28 is upward bent, the powder 31 collected on the partition plate 28 can be recovered and reused.

Figure 6:
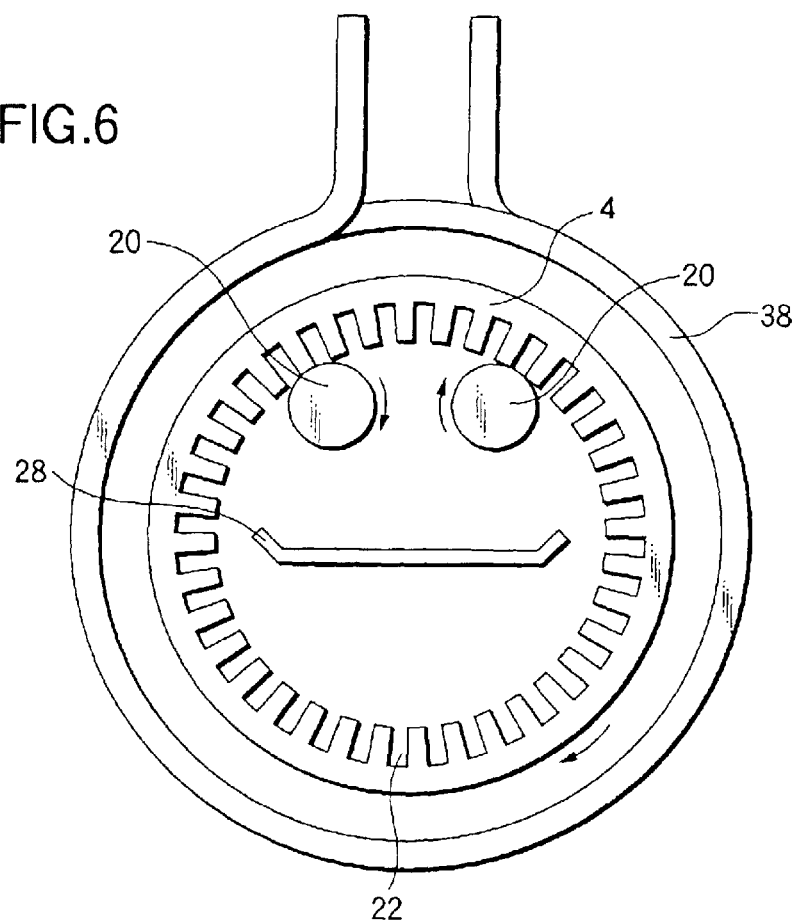
FIG. 6 is a diagram showing a step of and means for heating the stator core of Embodiment 1 of the invention to melt and harden the powder adhering to the stator core.

FIG. 6 is a diagram showing a step of and a member for removing the portion of the powder 31, which is caused to adhere to the stator core 4 in the process shown in FIG. 3, the portion adhering to the inner peripheral face of the stator core 4 and the like, and then heating the stator core 4 to melt and harden the powder 31. The apparatus shown in FIG. 6 has the rotating member shown in FIG. 1. A high-frequency heating coil 38 is placed in an outer radial side of the rotated stator core 4 to heat the stator core 4, thereby melting and hardening the powder 31 adhering to the stator core 4. The partition plate 28 is placed in the inner radial side of the stator core 4.

Since the apparatus is configured as shown in FIG. 6, the powder 31, which adheres to the stator core 4, and which does not contribute to the insulation of the stator coil 5 is removed, and the rotated stator core 4 is then heated by the high-frequency heating coil 38 to melt and harden the powder 31. Therefore, a uniform insulation film can be obtained. The placement of the partition plate 28 can prevent the powder 31 which drops from the rotated stator core 4, from adhering to the slots 22 and the inner peripheral face of the stator core 4, and being melted and hardened. Since the peripheral edge of the partition plate 28 is upward bent, the powder 31 collected on the partition plate 28 can be recovered and reused.

Figure 7:
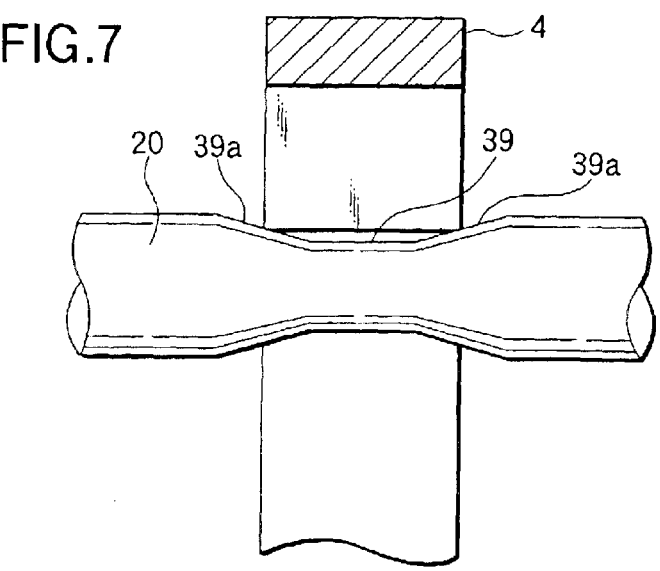
FIG. 7 is a partial section view showing an axial-movement restricting section disposed in one of the rollers in Embodiment 1 of the invention.

FIG. 7 is a partial section view showing an axial-movement restricting section disposed in one of the rollers 20. In a recess 39 formed in the roller 20, portions, which support the stator core 4 are thinned in a tapered manner as shown in the figure. The both end faces thereof in the axial direction of the inner peripheral face of the stator core 4 are positioned on the tapered faces 39a of the recess 39, respectively.

In the axial-movement restricting section, which is configured as shown in FIG. 7, the stator core 4 is prevented by the tapered faces 39a of the recess 39 from moving in the axial direction, so that the stator core 4 can be stably rotated. Therefore, the adhesion of the powder 31 can be uniformalized, and the removal, heating and hardening of the powder 31 can be stably conducted. In the case where the stator core 4 is to be transported to another apparatus in a state where the stator core is supported by the rollers 20, the transportation of the stator core 4 can be stably conducted. Even for stator cores 4 having different axial lengths or different inner diameters, the rollers 20 can be commonly used or are not required to be replaced with other ones, and hence the productivity can be improved. When the recess 39 is formed in at least one of the rollers 20, the above-mentioned effects can be attained.

As described above, in Embodiment 1, the powder 31 is caused to adhere to the stator core 4, the powder 31 adhering to the inner peripheral face of the stator core 4 is removed, and the stator core 4 is then heated to melt and harden the powder 31. Therefore, a jig for masking does not exist on the inner radial side of the stator core 4, so that the adhesion of the powder 31 is uniformarized, the insulation property and the space factor are improved, and a coil failure less occurs. Furthermore, the powder 31 on the inner peripheral face is surely removed, and hence does not rub against the rotor cores 8 and 9, and the air gap can be correspondingly reduced, so that the performance is improved. As a result, it is possible to obtain the stator core 4 of high reliability, high productivity, and high performance. Since the partition plate 28 is placed in the inner radial side of the stator core 4 and the powder 31 adhering to the inner peripheral face of the stator core 4 is removed, the powder 31, which is removed and drops from the stator core 4, can be prevented from adhering to the slots 22 and the like, and the adhesion of the powder 31 can be uniformarized. Therefore, the stator core 4, which is high in reliability and performance, can be obtained.

The production method has the steps of: causing the powder 31 to adhere to the entire surface of the stator core 4; removing the powder 31 adhering to the inner peripheral face of the stator core 4; and heating the stator core 4 to melt and harden the powder 31. Since a jig for masking does not exist on the inner radial side of the stator core 4, works of mounting and dismounting such a jig are not required, the adhesion of the powder 31 is uniformalized, and the powder 31 on the inner peripheral face is surely removed. Therefore, it is possible to obtain a method of producing a stator of high reliability, high productivity, and high performance. Since the partition plate 28 is placed in the inner radial side of the stator core 4, and the powder 31 adhering to the inner peripheral face of the stator core 4 is removed, it is possible to obtain a production method of high quality and high productivity in which the powder 31 that is removed and drops from the stator core 4 can be prevented from adhering to the slots 22 and the like, and the powder 31 collected on the partition plate 28 can be recovered and reused.

The apparatus for producing a stator core has the rollers 20 which are placed parallel to the axial direction of the stator core 4, and which support the inner periphery of the stator core 4, the motor 26 which rotates the rollers 20 to rotate the stator core 4, the power source 29 which causes the powder 31 to adhere to the stator core 4, the porous plate 30; and the hood 32. Therefore, a jig for masking does not exist on the inner radial side of the stator core 4, and hence works of mounting or dismounting, and positioning such a jig are not required, whereby the apparatus can be simplified. Furthermore, it is possible to obtain an apparatus for producing an economical stator core of high productivity and high performance in which the adhesion of the powder 31 is uniformalized. Since the partition plate 28 is placed, it is possible to obtain an apparatus of high productivity and high performance in which the powder 31 adheres not in an excessive amount but in a uniform amount, the setting range of the adhesion amount can be widened, and the powder 31 collected on the partition plate 28 can be recovered and reused.

The apparatus for producing a stator core has the rollers 20 which are placed parallel to the axial direction of the stator core 4, and which support the inner periphery of the stator core 4, the motor 26 which rotates the rollers 20 to rotate the stator core 4, the rubber plate 34 which removes the powder 31 adhering to the outer peripheral face of the stator core 4, and the air nozzle 35. Therefore, it is possible to obtain a high-performance apparatus for producing a stator core in which the powder 31 that adheres to the outer peripheral face of the stator core 4, and that does not contribute to the insulation of the stator coil 5 can be removed uniformly and surely. Moreover, it is possible to obtain a production apparatus of high quality and high productivity in which the placement of the partition plate 28 can prevent the powder 31 that is removed or drops from the stator core 4, from adhering to the slots 22 and the like, and the powder 31 collected on the partition plate 28 can be recovered and reused.

The apparatus for producing a stator core has the rollers 20 which are placed parallel to the axial direction of the stator core 4, and which support the inner periphery of the stator core 4, the motor 26 which rotates the rollers 20 to rotate the stator core 4, and the rotary brush 36 which removes the powder 31 adhering to the inner peripheral face of the stator core 4. Therefore, it is possible to obtain a high-performance apparatus for producing a stator core in which the powder 31 that adheres to the inner peripheral face of the stator core 4, and that does not contribute to the insulation of the stator coil 5 can be removed uniformly and surely. Since the rotary brush 36 which removes the powder 31 adhering to the stator core 4 is disposed, the apparatus can be configured as a production apparatus of high productivity in which the removal efficiency is high and the time period of the removal can be shortened. Moreover, it is possible to obtain a production apparatus of high quality and high productivity in which the placement of the partition plate 28 can prevent the powder 31 that is removed or drops from the stator core 4, from adhering to the slots 22 and the like, and the powder 31 collected on the partition plate 28 can be recovered and reused.

The apparatus for producing a stator core has the rollers 20 which are placed parallel to the axial direction of the stator core 4, and which support the inner periphery of the stator core 4, the motor 26 which rotates the rollers 20 to rotate the stator core 4, and the heating coil 38 which heats the stator core 4 to melt and harden the powder 31. Therefore, it is possible to obtain a high-performance apparatus for producing a stator core in which a uniform insulation film can be formed. Moreover, it is possible to obtain a production apparatus of high quality and high productivity in which the placement of the partition plate 28 can prevent the powder 31 that drops from the stator core 4, from adhering to the slots 22 and the like to be melted and hardened, and the powder 31 collected on the partition plate 28 can be recovered and reused.

Since a plurality of rollers 20 are disposed, the stator core 4 is stably rotated. Therefore, it is possible to obtain an apparatus for producing the stator core 4 of high productivity and high performance in which the adhesion of the powder 31 is uniformalized, and the removal, heating and hardening of the powder 31 can be stably conducted. Since the axial-movement restricting section is disposed in at least one of the rollers 20, the stator core 4 is prevented from moving in the axial direction, so that the stator core 4 can be stably rotated. Therefore, the apparatus can be configured as an apparatus for producing the stator core 4 of high productivity and high performance in which the adhesion of the powder 31 is uniformalized, the removal, heating and hardening of the powder 31 is stably conducted, and, even for stator cores 4 having different axial lengths or different inner diameters, the rollers 20 are not required to be replaced with other ones. In the case where, among the above-described apparatuses for producing a stator core 4, at least two production apparatuses may be connected to one another, i.e., the case where the stator core 4 is to be transported to another step in a state where the stator core is supported by the rollers 20, or the stator core 4 is transported by another transporting apparatus and then supported on the rollers 20, the apparatus can be configured as a production apparatus in which the productivity of the stator core 4 is further improved. The arrangement sequence of the apparatus which removes the powder 31 adhering to the outer peripheral face of the stator core 4, and that which removes the powder 31 adhering to the inner peripheral face of the stator core 4 may be inverted. In the apparatuses, the partition plate 28 may have different shapes. Alternatively, the partition plate 28 may be configured integrally with the rollers 20, and transported among the apparatuses in the state where the stator core 4 is supported. It is a matter of course that a large number of the rollers 20 may be simultaneously rotated by using chains or the like.

The apparatuses comprise: the rollers 20 which are placed parallel to the axial direction of the stator core 4, and which support the inner periphery of the stator core 4; the motor 26 which rotates the rollers 20 to rotate the stator core 4; the power source 29 which causes the powder 31 to adhere to the stator core 4; the porous plate 30; the hood 32; the rotary brush 36 which removes the powder 31 adhering to the inner peripheral face of the stator core 4; and the heating coil 38 which heats the stator core 4 to melt and harden the powder 31 adhering to the stator core 4. Since a jig for masking does not exist on the inner radial side of the stator core 4, works of mounting or dismounting, and positioning such a jig are not required, whereby the apparatuses are simplified. Moreover, the adhesion of the powder 31 can be uniformalized, and the powder 31 adhering to the inner peripheral face of the stator core 4 can be removed uniformly and surely. Since a series of apparatuses are continuously connected to one another, it is not necessary to transfer the stator core 4 to other rollers 20. Therefore, it is possible to obtain a production apparatus of high performance and high productivity in which the powder 31 is prevented from dropping.

Embodiment 2

Figure 8:
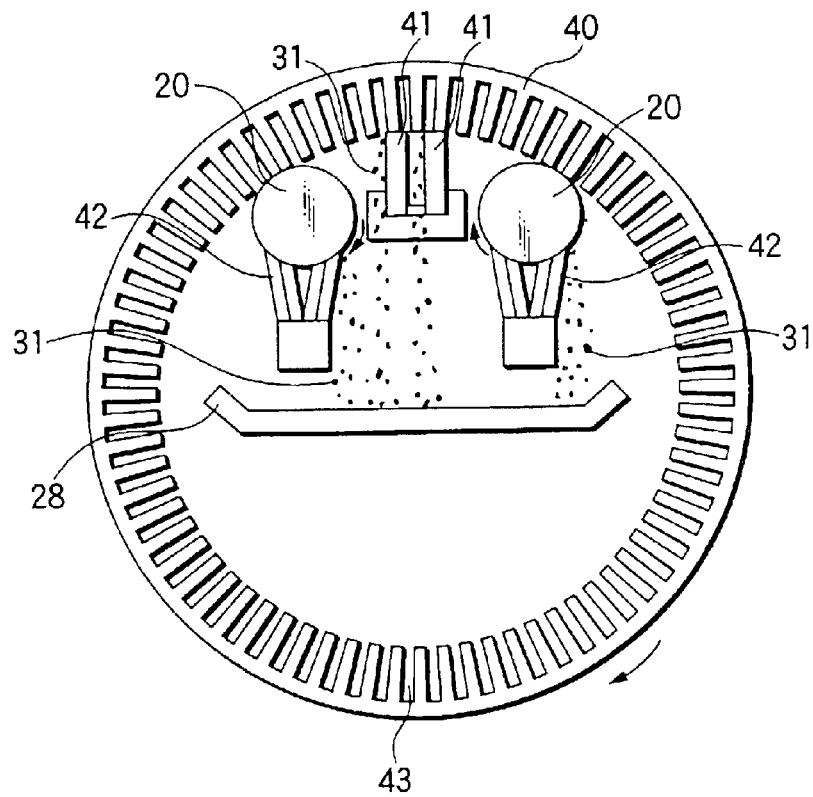
FIG. 8 is a diagram showing a step of and means for removing powder adhering to the inner peripheral face of the stator core of Embodiment 2 of the invention, and also means for removing powder adhering to the rollers.

FIG. 8 illustrates a stator core according to Embodiment 2 of the invention, and a method and apparatus for producing the stator core. In the same manner as FIG. 3, the powder 31 adheres to a stator core 40. FIG. 8 is a diagram showing a step of and a member for removing the powder 31 adhering to the inner peripheral face of the stator core 40, and a member for removing the powder 31 adhering to the rollers 20. The apparatus has rotating member similar to that shown in FIG. 1. The apparatus has a removing member for rubbing the inner peripheral face of the rotated stator core 40 with rubber plates 41 to remove the powder 31 adhering to the inner peripheral face of the stator core 40. The apparatus further has stationary brushes 42, which remove the powder 31 adhering to the rollers 20. The stationary brushes 42 are made of horse hair. In the same manner as FIG. 5, the partition plate 28 is placed in the inner radial side of the stator core 40. In the illustrated example, the stator core 40 shown in FIG. 8 has an outer diameter of about 130 mm, and the number of the slots 43 is 72.

Since the apparatus is configured as shown in FIG. 8, the powder 31 adhering to the inner peripheral face of the stator core 40 can be removed uniformly and surely by rubbing the rubber plates 41 against the inner peripheral face of the rotated stator core 40, which is rotated by the rollers 20. Since the apparatus comprises also the stationary brushes 42, which remove the powder 31 adhering to the rollers 20, the powder 31 adhering to the rollers 20 does not adhere to the inner peripheral face of the rotated stator core 40. Since the removal is conducted simultaneously with that from the inner peripheral face, higher removal efficiency is attained and the time period of the removal can be shortened. Since the rubber plates 41 and the stationary brushes 42 do not require a rotation mechanism, the apparatus can be configured simply and economically. The partition plate 28 exerts the same effects as described above. In contrasts to the stator core 4 of Embodiment 1, the number of the slots is increased from 36 to 72, and the slot area is correspondingly reduced. In the masking method using the jig according to a related art, the powder 31 enters further hardly the slots 43, and hence uniform application cannot be conducted. By contrast, according to the invention, uniform application can be conducted even in this case.

As described above, in Embodiment 2, as compared with Embodiment 1, no rotation mechanism is disposed in the member for removing the powder 31 adhering to the inner peripheral face of the stator core 40, and that for removing the powder 31 adhering to the outer peripheries of the rollers 20. Therefore, the configuration of the apparatus is simple, has high reliability, and can be economically produced.

Embodiment 3

Figure 9:
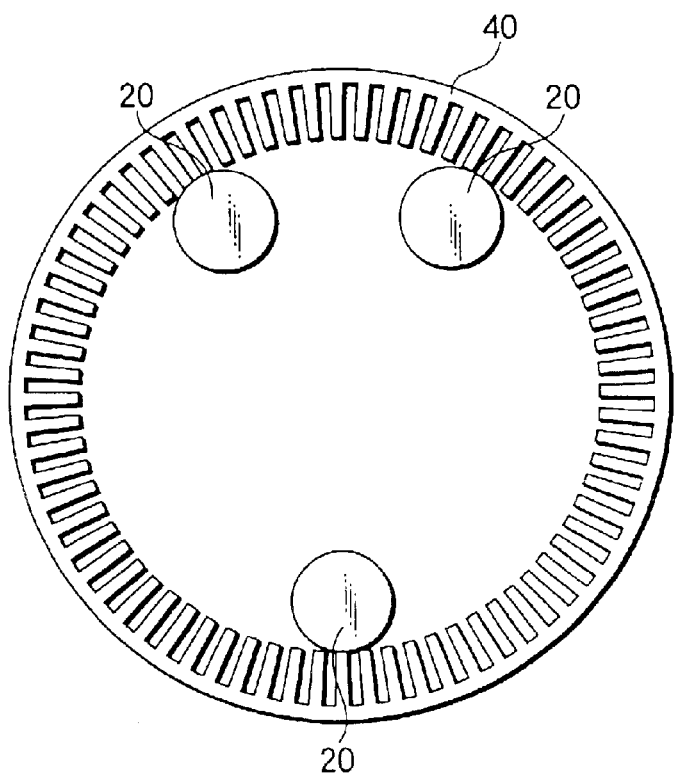
FIG. 9 is a front view of a stator core and rollers in the case where the number of the rollers is 3, in Embodiment 3 of the invention.
Figure 10:
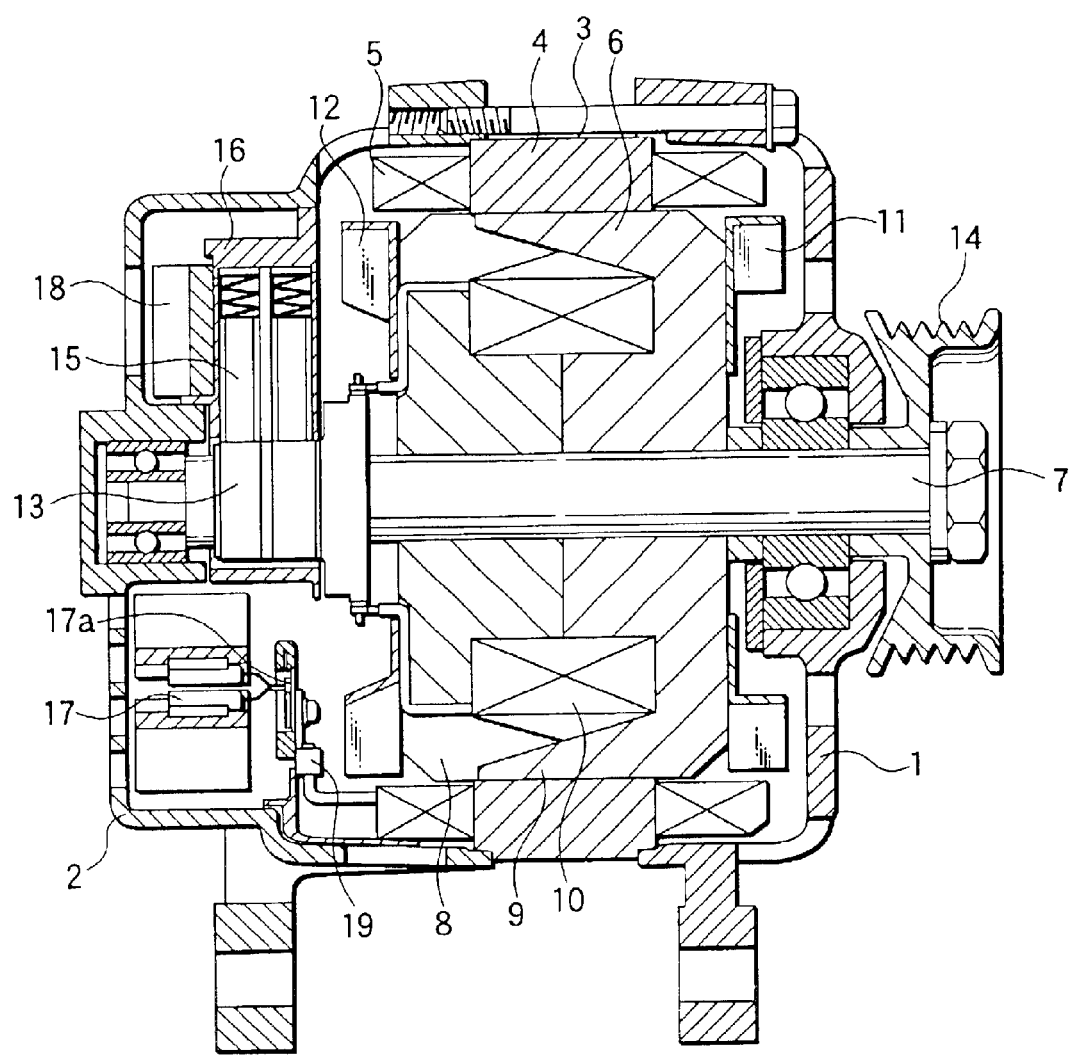
FIG. 10 is a section view showing the configuration of a conventional vehicular alternator.

In the above, the examples in which the two rollers 20 are used have been described. Alternatively, as shown in the front view of FIG. 9 illustrating the stator core 40 and three rollers 20, three rollers 20 may be disposed. In the invention, only one roller 20 may be employed. In the case of one roller, however, it is difficult to stably rotate the stator core 40. By contrast, when an excessive number of the rollers 20 are disposed, the rotation is stabilized, but the powder is hardly applied into the slots 43 because the powder is blocked by the rollers 20. Therefore, it is preferable to dispose two or three rollers. When a plurality of rollers 20 are disposed, the apparatus can be configured as an apparatus of high productivity and high performance.

In the above, a stator core for a vehicular alternator has been described. It is a matter of course that the invention can be applied also to, for example, a stator core for a traction motor of a vehicle, or that of a motor generator.

What is claimed is:

1. A stator core comprising:

a plurality of teeth extending in an inner radial direction of said stator core; and slots, formed between said the teeth, a powder adhered to the stator core, except for an inner peripheral face of the stator core where at said powder is removed; and said powder being melted and hardened by heat-treatment; and further comprising a powder collection device comprised of a partition placed radially inside of the stator core when the powder adhering to the inner peripheral face of the stator core is removed.

2. A method of producing a stator core comprising a plurality of teeth extended in an inner radial direction of said stator core and slots formed between said teeth, the method comprising the steps of:

causing powder to adhere to the stator core;

removing the powder adhering to an inner peripheral face of the stator core; and heating the stator core to melt and harden the powder; and wherein in the removing step, a partition plate is placed internally of the stator core and the powder adhering to the inner peripheral face of the stator core is then removed, a portion of said removed powder being collected by said partition plate.

* * * * *